(12) United States Patent
Lee et al.

(10) Patent No.: US 9,930,636 B2
(45) Date of Patent: Mar. 27, 2018

(54) COMMUNICATION TRANSMISSION SYSTEM AND METHOD FOR XHRPD

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/790,545

(22) Filed: Jul. 2, 2015

(65) Prior Publication Data

US 2016/0212726 A1    Jul. 21, 2016

Related U.S. Application Data

(60) Provisional application No. 62/105,709, filed on Jan. 20, 2015.

(51) Int. Cl.
*H04W 48/02* (2009.01)
*H04W 68/00* (2009.01)
*H04W 88/08* (2009.01)

(52) U.S. Cl.
CPC ......... *H04W 68/005* (2013.01); *H04W 48/02* (2013.01); *H04W 88/08* (2013.01)

(58) Field of Classification Search
CPC ... H04W 68/00; H04W 68/02; H04W 68/025; H04W 52/02; H04W 68/12; H04W 68/005; H04W 48/02; H04W 88/08
See application file for complete search history.

(56) References Cited

U.S. PATENT DOCUMENTS

| 2010/0203906 | A1* | 8/2010 | Fang | H04W 68/025 455/458 |
| 2012/0039171 | A1* | 2/2012 | Yamada | H04L 47/12 370/232 |
| 2015/0124594 | A1* | 5/2015 | Ryu | H04W 74/0875 370/230 |
| 2016/0057724 | A1* | 2/2016 | Horn | H04W 60/005 455/435.1 |

* cited by examiner

*Primary Examiner* — Ted Wang
(74) *Attorney, Agent, or Firm* — Schiff Hardin LLP

(57) ABSTRACT

Communication transmission system and method are provided. The communication transmission system includes a base station and user equipment. The base station is configured to control a page response for terminated services. The user equipment is configured to receive the page response from the base station. In addition, the user equipment obtains priorities of the different terminated services according to the page response from the base station.

21 Claims, 2 Drawing Sheets

COMMUNICATION TRANSMISSION SYSTEM AND METHOD FOR XHRPD

CROSS REFERENCE TO RELATED APPLICATIONS

This application claims priority of Provisional Patent Application No. 62/105,709, filed on Jan. 20, 2015, the entirety of which is incorporated by reference herein

BACKGROUND OF THE INVENTION

Field of the Invention

The invention generally relates to a communication transmission technology for Extended Cell High Rate Packet Data (xHRPD), and more particularly, to transmitting a page response to user equipment for terminated services.

Description of the Related Art

Wireless communication systems are widely employed to provide various telecommunication services such as telephony, video, data, messaging, and broadcast. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Teletransmissions System (UMTS) mobile standard promulgated by the Third Generation Partnership Project (3GPP). In addition, Extended Cell High Rate Packet Data (xHRPD) is based on the CDMA2000 family of HRPD specifications by 3GPP2.

In xHRPD Rev A, Service Based Access Control (SBAC) is introduced, which gives the system the capability to control access based on different type of services or applications. However, the SBAC scheme is applied to mobile originated services only. Therefore, for the current xHRPD documents, there is no description on how to do access control in the scenario of terminated services.

BRIEF SUMMARY OF THE INVENTION

Communication transmission system and method are provided to overcome the problems mentioned above.

An embodiment of the invention provides a communication transmission system for xHRPD. The communication transmission system comprises a base station and user equipment. The base station is configured to control a page response for terminated services. The user equipment is configured to receive the page response from the base station. In the embodiment of the invention, the user equipment obtains priorities of the different terminated services according to the page response from the base station.

In the embodiment of the invention, the page response may comprise a plurality of persistence test values, wherein each of the persistence test values corresponds to each type of terminated services respectively, wherein the persistence test values are defined in AccessParameters message or Paging message.

In the embodiment of the invention, the page response may comprise a persistence test value, wherein the persistence test value corresponds to all of the terminated services, wherein the persistence test value is defined in AccessParameters message.

In the embodiment of the invention, the page response may comprise PageResponseAPersistence, wherein the PageResponseAPersistence is defined in Page Message and procedures corresponding to the PageResponseAPersistence are added in Access Channel MAC protocol.

In the embodiment of the invention, if a PageResponseAPersistence value is set to 0x01, and the user equipment is initiating a connection in response to the page response and the Page Message includes the PageResponseAPersistence value, the user equipment establishes the connection according to the PageResponseAPersistence value. If the PageResponseAPersistence value is set to 0x00, or the user equipment is initiating a connection in response to the page response and the Page Message does not include the PageResponseAPersistence value, the user equipment establishes the connection according to Service Based Access Control (SBAC).

An embodiment of the invention provides a communication transmission method for xHRPD. The communication transmission method comprises the following steps: a base station transmits a page to user equipment for terminated services; and the user equipment receives the page from the base station. The communication transmission method further comprises a step wherein the user equipment obtains the priorities of the different terminated services according to the page from the base station.

In the embodiment of the invention, the page may comprise a plurality of persistence test values, wherein each of the persistence test values corresponds to each type of terminated services respectively, wherein the persistence test values are defined in AccessParameters message or Paging message.

In the embodiment of the invention, the page may comprise a persistence test value, wherein the persistence test value corresponds to all of the terminated services, wherein the persistence test value is defined in AccessParameters message.

In the embodiment of the invention, the page response may comprise PageResponseAPersistence, wherein the PageResponseAPersistence is defined in Page Message and procedures corresponding to the PageResponseAPersistence are added in Access Channel MAC protocol.

In the embodiment of the invention, if a PageResponseAPersistence value is set to 0x01, and the user equipment is initiating a connection in response to the page response and the Page Message includes the PageResponseAPersistence value, the user equipment establishes the connection according to the PageResponseAPersistence value. If the PageResponseAPersistence value is set to 0x00, or the user equipment is initiating a connection in response to the page response and the Page Message does not include the PageResponseAPersistence value, the user equipment establishes the connection according to Service Based Access Control (SBAC).

An embodiment of the invention provides a base station. The base station comprises a transmitter. The transmitter is configured to transmit a page response to user equipment for terminated services, wherein the page response indicates the priorities of the different terminated services.

An embodiment of the invention provides a communication transmission method of a base station for xHRPD. The communication transmission method comprises the step of transmitting a page response to user equipment for terminated services, wherein the page response indicates the priorities of the different terminated services.

Other aspects and features of the invention will become apparent to those with ordinary skill in the art upon review of the following descriptions of specific embodiments of methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
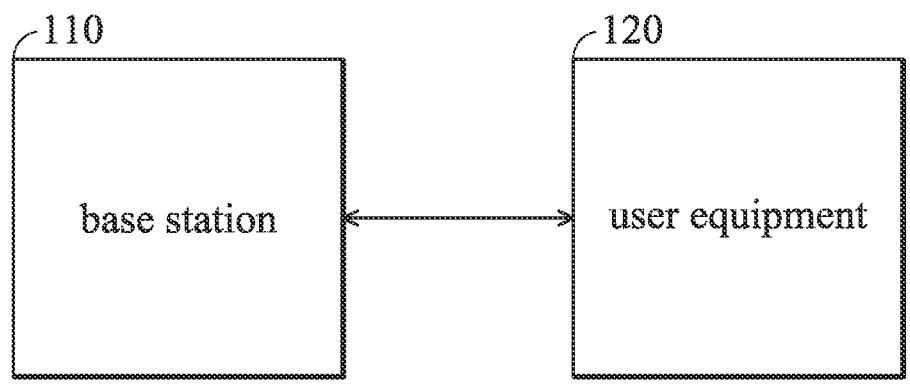
FIG. 1 is a communication transmission system 100 according to an embodiment of the invention.

FIG. 1 is a communication transmission system 100 according to an embodiment of the invention. The communication transmission system 100 is applied to Extended Cell High Rate Packet Data (xHRPD) technology. As shown in FIG. 1, the communication transmission system 100 comprises a base station 110 and user equipment 120. FIG. 1 presents a simplified block diagram in which only the elements relevant to the invention are shown. However, the invention should not be limited to what is shown in FIG. 1. In an embodiment of the invention, the memory buffer 130 is configured to store the data and signals.

The base station 110 may be a fixed station or access network used for communicating with the terminals and may also be referred to as an access point, a Node B, an enhanced base station, an eNodeB (eNB), or some other terminology. In an embodiment of the invention, the base station 110 is configured to control a page response for terminated services. In an embodiment of the invention, the base station 110 may comprises a transmitter (not shown in figures) to transmit a page response to the user equipment 120 for the terminated services.

Various embodiments are described herein in connection with the user equipment 120. A wireless terminal can refer to a device providing voice and/or data connectivity to a user. The user equipment 120 can be connected to a computing device such as a laptop computer or desktop computer, or it can be a self-contained device such as a personal digital assistant (PDA). In addition, the user equipment 120 can be called a system, subscriber unit, subscriber station, mobile station, mobile, remote station, access point, remote terminal, access terminal, user terminal, user agent, or user device. The user equipment 120 can be a subscriber station, wireless device, cellular telephone, PCS telephone, cordless telephone, Session Initiation Protocol (SIP) phone, wireless local loop (WLL) station, handheld device having wireless connection capability, or other processing devices connected to a wireless modem.

In an embodiment of the invention, when the base station 110 needs to provide the terminated services (or applications) to the user equipment 120, the base station 110 will transmit a page response to the user equipment 120 for the terminated services. In an embodiment of the invention, the terminated services may comprise voice services, short message services, emergency services, packet data services and so on. In an embodiment of the invention, the page response comprises the information related to the priorities of the different terminated services. Therefore, when the user equipment 120 receives the page response from the base station 110, the user equipment 120 will obtain the information related to the priorities of the different terminated services according to the page response from the base station 110.

In an embodiment of the invention, the page response comprises a plurality of persistence test values, wherein each of the persistence test values corresponds to each type of terminated service respectively. That is to say each terminated service has its specific persistence test value. In the embodiment of the invention, the persistence test values are defined in AccessParameters message or Paging message. The base station can broadcast the AccessParameters message to all user equipment in a cell. Namely, all user equipment of the cell may obtain the same persistence test values corresponding different terminated services from the AccessParameters message.

In another embodiment of the invention, the page response comprises only one persistence test value, wherein the persistence test value corresponds to all of the terminated services. That is to say all of the terminated services may correspond to the same persistence test value. In the embodiment of the invention, the persistence test value is defined in AccessParameters message.

In another embodiment of the invention, the page response comprises a parameter PageResponseAPersistence. In the current xHRPD document, the parameter PageResponseAPersistence is defined in the Page Message. However, there is no text on the current xHRPD document to indicate how to use the parameter PageResponseAPersistence. In the embodiment of the invention, the parameter PageResponseAPersistence is defined in the Page Message and the related procedures corresponding to the parameter PageResponseAPersistence are added in Access Channel medium-access control (MAC) protocol to process the PageResponseAPersistence. In the embodiment of the invention, the base station 110 may unicast the Page Message to the user equipment 120. Namely, for different user equipment, the setting of the parameter PageResponseAPersistence for the terminated services may be different.

In an embodiment of the invention, if a PageResponseAPersistence value is set to 0x01 (i.e. the user equipment 120 supports the PageResponseAPersistence), and the user equipment 120 is initiating a connection in response to the page response and the page message includes the PageResponseAPersistence value, the user equipment 120 may establish the connection according to the PageResponseAPersistence value.

In an embodiment of the invention, if the PageResponseAPersistence value is set to 0x00 (i.e. the user equipment 120 does not support the PageResponseAPersistence), or the user equipment 120 is initiating a connection in response to the page response and the page message does not include the PageResponseAPersistence value, the user equipment 120 may establish the connection according to Service Based Access Control (SBAC).

Figure 2:
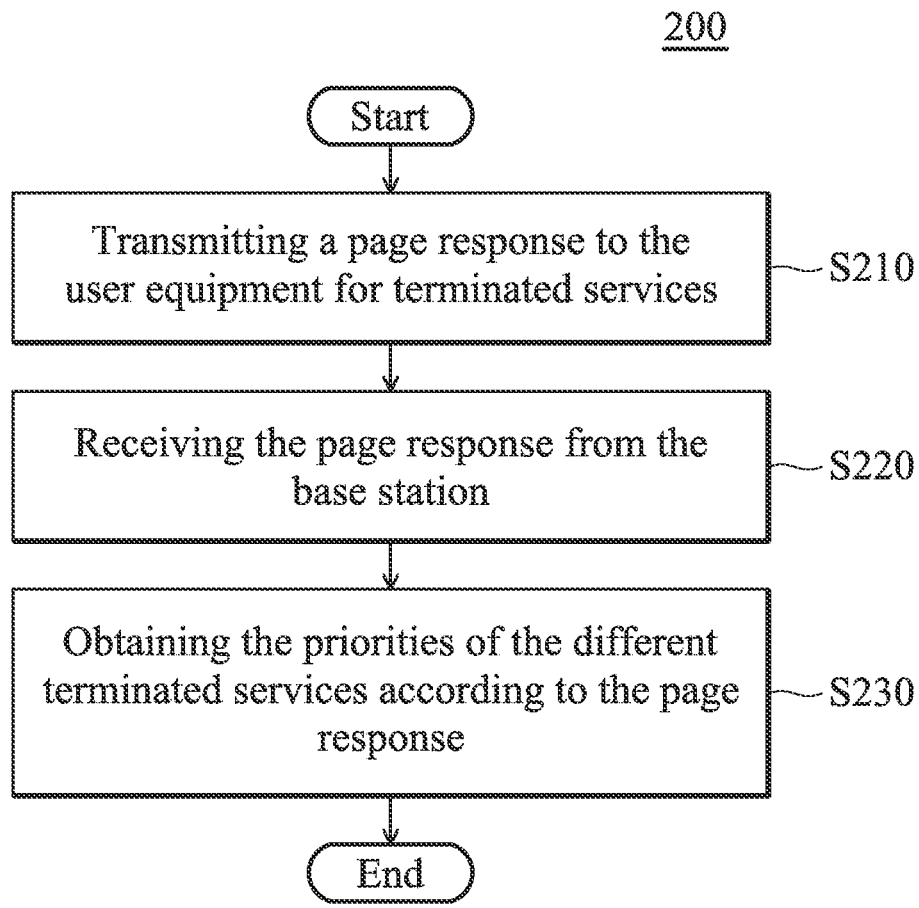
FIG. 2 is a flow chart illustrating a communication transmission method 200 of according to an embodiment of the invention.

FIG. 2 is a flow chart 200 illustrating a communication transmission method of according to an embodiment of the invention. The communication transmission method is applied to the communication transmission system 100. First, in step S210, the base station 110 transmits a page response to the user equipment 120 for terminated services. In step S220, the user equipment 120 receives the page response from the base station 110. In step S230, the user equipment 120 obtains the priorities of the different terminated services according to the page response.

In an embodiment of the invention, in the communication transmission method 200, the page response comprises a plurality of persistence test values, wherein each of the persistence test values corresponds to each type of terminated service respectively. In the embodiment of the invention, the persistence test values are defined in AccessParameters message or Paging message.

In another embodiment of the invention, in the communication transmission method 200, the page response comprises a persistence test value, wherein the persistence test value corresponds to all of the terminated services. In the embodiment of the invention, the persistence test value is defined in AccessParameters message.

In another embodiment of the invention, in the communication transmission method 200, the page response comprises PageResponseAPersistence, wherein the PageResponseAPersistence is defined in Page Message and procedures corresponding to the PageResponseAPersistence are added in Access Channel MAC protocol.

If a PageResponseAPersistence value is set to 0×01 (i.e. the user equipment 120 supports the PageResponseAPersistence), and the user equipment 120 is initiating a connection in response to the page response and the page message includes the PageResponseAPersistence value, the user equipment 120 may establish the connection according to the PageResponseAPersistence value. If the PageResponseAPersistence value is set to 0×00 (i.e. the user equipment 120 does not support the PageResponseAPersistence), or the user equipment 120 is initiating a connection in response to the page response and the page message does not include the PageResponseAPersistence value, the user equipment 120 may establish the connection according to Service Based Access Control (SBAC).

In the communication transmission methods of the invention, the user equipment can obtain information related to the terminated services (e.g. the priorities of the different terminated services) according to the page response transmitted by the base station.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication transmission system for Extended Cell High Rate Packet Data (xHRPD), comprising:
a base station configured for wireless communication using Extended Cell High Rate Packet Data, the base station being configured to control a page response for terminated services using Extended Cell High Rate Packet Data, the page response defining respective priorities of the terminated services and including a PageResponseAPersistence parameter defined in a Page Message; and
a user equipment configured for wireless communication with the base station using Extended Cell High Rate Packet Data, the user equipment being configured to:
receive the page response for terminated services using Extended Cell High Rate Packet Data from the base station;
determine the priorities of the respective terminated services using Extended Cell High Rate Packet Data based on the page response from the base station to facilitate access control for the terminated services; and
add procedures corresponding to the PageResponseAPersistence parameter in an Access Channel MAC protocol of the user equipment.

2. The communication transmission system of claim 1, wherein the page response comprises a plurality of persistence test values, wherein each of the persistence test values corresponds to each type of terminated service respectively.

3. The communication transmission system of claim 2, wherein the persistence test values are defined in AccessParameters message or the Page message.

4. The communication transmission system of claim 3, wherein the base station broadcasts AccessParameters message to all user equipment in a cell.

5. The communication transmission system of claim 1, wherein the page response comprises a persistence test value, wherein the persistence test value corresponds to all of the terminated services.

6. The communication transmission system of claim 5, wherein the persistence test value is defined in AccessParameters message.

7. The communication transmission system of claim 1, wherein the base station unicasts the Page Message to the user equipment.

8. The communication transmission system of claim 1 wherein if a value of the PageResponseAPersistence parameter is set to 0x01, and the user equipment is initiating a connection in response to the page response and the Page Message includes the PageResponseAPersistence parameter value, the user equipment establishes the connection according to the PageResponseAPersistence parameter value.

9. The communication transmission system of claim 8, wherein if the PageResponseAPersistence parameter value is set to 0x00, or the user equipment is initiating a connection in response to the page response and the Page Message does not include the PageResponseAPersistence parameter value, the user equipment establishes the connection according to Service Based Access Control (SBAC).

10. The communication transmission system of claim 1, wherein the PageResponseAPersistence parameter is one of a first or second value, wherein the user equipment is configured and operates to establish a first wireless communication connection if the PageResponseAPersistence parameter is the first value, and the user equipment is configured and operarates to establish a second wireless communication connection if the PageResponseAPersistence parameter is the second value.

11. A communication transmission method for xHRPD, comprising:
    transmitting, by a base station, a page response to a user equipment for terminated services in xHRPD communications, the page response defining respective priorities of the terminated services and including a PageResponseAPersistence parameter defined in a Page Message;
    receiving, by the user equipment, the page response from the base station;
    determining, by the user equipment, the priorities of the respective terminated services for xHRPD communications based on the page response from the base station to facilitate access control for the terminated services; and
    adding, by the user equipment, procedures corresponding to the PageResponseAPersistence in an Access Channel MAC protocol.

12. The communication transmission method of claim 11, wherein the page response comprises a plurality of persistence test values, wherein each of the persistence test values corresponds to each type of terminated service respectively.

13. The communication transmission method of claim 12, wherein the persistence test values are defined in AccessParameters message or the Page message.

14. The communication transmission method of claim 13, further comprising:
    broadcasting, by the base station, the AccessParameters message to all user equipment in a cell.

15. The communication transmission method of claim 11, wherein the page response comprises a persistence test value, wherein the persistence test value corresponds to all of the terminated services.

16. The communication transmission method of claim 15, wherein the persistence test value is defined in AccessParameters message.

17. The communication transmission method of claim 11, further comprising:
    unicasting, by the base station, the Page Message to the user equipment.

18. The communication transmission method of claim 11, wherein if a value of the PageResponseAPersistence parameter is set to 0x01, and the user equipment is initiating a connection in response to the page response and the Page Message includes the PageResponseAPersistence parameter value, establishing the connection according to the PageResponseAPersistence parameter value by the user equipment.

19. The communication transmission method of claim 18, wherein if the PageResponseAPersistence parameter value is set to 0x00, or the user equipment is initiating a connection in response to the page response and the Page Message does not include the PageResponseAPersistence parameter value, establishing the connection according to Service Based Access Control (SBAC) by the user equipment.

20. A base station for xHRPD, comprising:
    a transmitter configured for xHRPD wireless communication; and
    a controller that is configured to control the transmitter to transmit a page response defining respective priorities of terminated services to a user equipment for the terminated services, the page response including a PageResponseAPersistence parameter defined in a Page Message, and an Access Channel MAC protocol of the user equipment including procedures corresponding to the PageResponseAPersistence parameter, wherein access control for the terminated services is facilitated based on the priorities of the respective terminating services.

21. A communication transmission method of a base station for xHRPD, comprising:
    defining respective priorities of terminated services to generate a page response including the defined respective priorities and a PageResponseAPersistence parameter defined in a Page Message; and
    transmitting the page response including the defined respective priorities of the terminated services and the PageResponseAPersistence parameter to a user equipment for terminated services for xHRPD wireless communications, an Access Channel MAC protocol of the user equipment including procedures corresponding to the PageResponseAPersistence parameter, wherein access control for the terminated services is facilitated based on a determination of the priorities of the respective terminating services using the page response.

* * * * *